Aug. 16, 1938.  R. CHILTON  2,127,460
ENGINE ACCESSORY DRIVE
Filed Jan. 23, 1936   5 Sheets-Sheet 1

INVENTOR
ROLAND CHILTON
BY
ATTORNEY

Aug. 16, 1938.                R. CHILTON                  2,127,460
                          ENGINE ACCESSORY DRIVE
                          Filed Jan. 23, 1936          5 Sheets-Sheet 5

INVENTOR.
                                           ROLAND CHILTON
                                  BY
                                                  ATTORNEY.

Patented Aug. 16, 1938

2,127,460

UNITED STATES PATENT OFFICE 2,127,460

ENGINE ACCESSORY DRIVE

Roland Chilton, Ridgewood, N. J., assignor, by mesne assignments, to Wright Aeronautical Corporation, Paterson, N. J., a corporation of New York Application January 23, 1936, Serial No. 60,380

7 Claims. (Cl. 123—195)

This invention relates to the arrangement, mounting and driving of engine accessories and particularly to accessory systems for radial aircraft engines.

In current conventional practice such engines have, bolted to the rear of the crankcase, a supercharger section having mounting lugs for securing the engine to a circular airplane mounting ring. Most of the engine accessories such as magnetos, electric generator, starter, fuel pump, oil pumps, etc. have been mounted on a rear cover, attached to the supercharger section, where they are embraced by the ring through which they must be passed in assembling the engine into the aircraft.

As the art has developed, provision has been required for driving and mounting additional accessories. For example, in recent years vacuum pumps for operating de-icing, and instrument equipment, additional oil pumps for operating retractable landing gears and automatic pilots, auxiliary power take-offs, an added supercharger stage, multiple speed or variable speed supercharger drives, have been required; while the size of the starters, magnetos, generators, etc. have increased. This has resulted in prohibitive congestion at the rear end of the engine, and it has been necessary to mount some of the units around the sides of the rear section, as has been the conventional practice with the carburetor. With the conventional mounting ring, however, this requires disassembly of these side-mounted units and re-assembly after the engine has been secured to the mounting ring. This greatly increases the time required for mounting and dismounting the power plant and involves risk of improper re-assembly of the accessories.

Objects of this invention are to overcome these objections and to provide a rear section of simplified form, where interferences between the engine mount and the accessories are eliminated, and whereby the various auxiliary units are less crowded and more accessible, while the over-all length of the engine is reduced. Accordingly, in the present invention substantially all of the accessories are mounted in radial disposition around the circumference of the rear section whereby the length, axially of the engine, taken up by these units is greatly reduced, while the engine mount attachment is brought to the rear of this ring of accessories. The accessory drives comprise a circumferential assemblage of bevel gears in serial engagement, within which there is defined a very large space available for two-stage superchargers with variable speed or gear-shift drives, without increasing the overall length of the rear section.

Metered injection fuel-chargers represent an additional engine accessory that must now be provided for and a feature of the invention resides in provision whereby either a conventional carburetor or a fuel-charger may be accommodated by applying appropriate adapters to the main accessory section.

A further object of the invention is to provide an accessory section affording considerable latitude in the selection of the accessories to be used in their relative location.

To these ends there is here featured a disposition of gearing capable, by selective assembly, of affording a selection of driving ratios at the various stations so that one design of accessory section may be applied to a variety of engines, even though the number of cylinders and the rotational speed of the magnetos and other accessories may vary.

A still further object is to provide means whereby the direction of rotation of all the accessories may be reversed so that the same complete assembly may be used for both clockwise and counter-clockwise engines.

Other objects and advantages will be obvious from, or will be pointed out in, the following description with reference to the drawings, in which:

Fig. 6 is a fragmentary plan view illustrating the reversing gear disposition.

Figure 1:
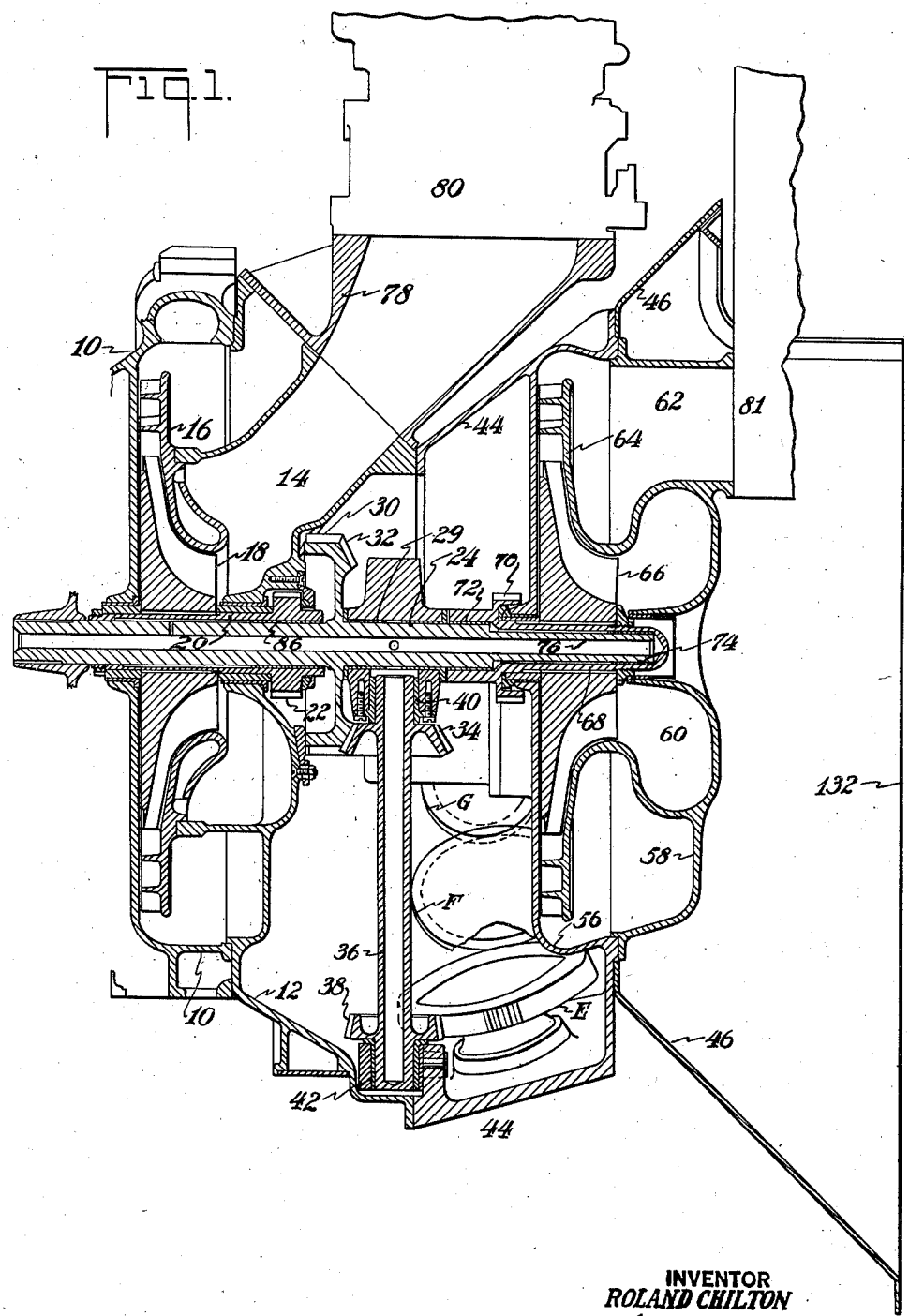
Fig. 1 is an axial section on the line 1—1 of Fig. 2.

In the drawings, 10 designates a fragmentary section of a conventional supercharger section secured to the engine crankcase (not shown) in the usual way. To this engine supercharger section there is bolted an intermediate section 12 containing an inlet duct 14, and in which is disposed a diffuser plate 16 and a supercharger impeller 18 mounted on a conventional impeller shaft 20 equipped with a pinion 22. An engine extension or tailshaft 24 supports the impeller shaft 20 on bushings 26 in the usual way, this tail-shaft 24 being splined to and driven by a hub 28 secured to an engine crankshaft (not shown) and being supported in the bearing 29. The tailshaft 24 is provided with a main spur gear 30 which is additionally equipped with bevel gear teeth 32 meshed with a bevel pinion 34 on a radial shaft 36 which carries, at its outer end, a bevel pinion 38 and is supported in bearings 40, 42.

Bolted to the intermediate section 12 is an accessory mounting section 44, the exterior of which comprises a polygon (Fig. 2) affording mounting faces for (in this instance) eleven accessories. For each of these there is provided a bevel gear, these being identified by the reference letters A to K inclusive, and being meshed in series as shown; certain of the gears being of double or compound form as required to give the desired speed ratio at the associated accessory.

The bearings 40, 42 of the radial accessory drive shaft 36 may be alternately arranged so that the gear 38 meshes with either the gear F or the gear E (see Fig. 6), thus giving alternate rotational directions to all the accessories. It will be noted the gears E, F are made wider than the others, and the accessories developing high driving torque, i. e., the starter and the generator, are preferably located at these main driving stations. Since the power required by the other accessories is relatively small, the balance of the gears may be of narrow and lighter construction.

The engine is mounted, at the rear face of the accessory section 44, on a mount indicated as the conical member 46.

The supercharger pinion 22 may be driven in the usual way by a layshaft 48 supported on suitable bearings 50 equipped with a pinion 52 meshing the main gear 30, and also with a gear 54 meshed with the pinion 22.

The accessories section 44 may additionally include a first stage supercharger housing 56, in which case a first stage supercharger cover 58 having an inlet 60 (Fig. 3) and outlet 62 (Fig. 1) will be provided incorporating a diffuser 64. Within these housings a first stage supercharger impeller 66 is mounted on a hollow shaft 68 equipped with a pinion 70 and with bushings 72, 74 whereby the impeller is mounted on a suitable extension 76 of the tailshaft 24.

In the case where a carburetor is used, an adapter 78 is attached to the inlet passage 14 carrying the carburetor which is indicated at 80. The delivery passage 62 of the first stage supercharger is connected to the carburetor inlet, preferably through an intercooler 81 (Fig. 4).

Alternatively, an adapter 82 (Fig. 4) may be used, this having a mounting flange 84 to take a fuel-charger 86 and incorporating an inlet passage 87 and a drive shaft 88 having a fuel-charger driving coupling 90 at its upper end and a helical gear 92 at its lower end. A layshaft comprising a spur gear 94 meshed with the main drive gear 30 and having a spiral gear 96 meshed with the gear 92 completes the fuel charger drive. The intermediate section 12 is provided with an opening 98 through which fuel pipes 100 are led around within the supercharger housing 10, 12 to jets 102 located at the bottom of inlet pipes 104.

Figure 4:
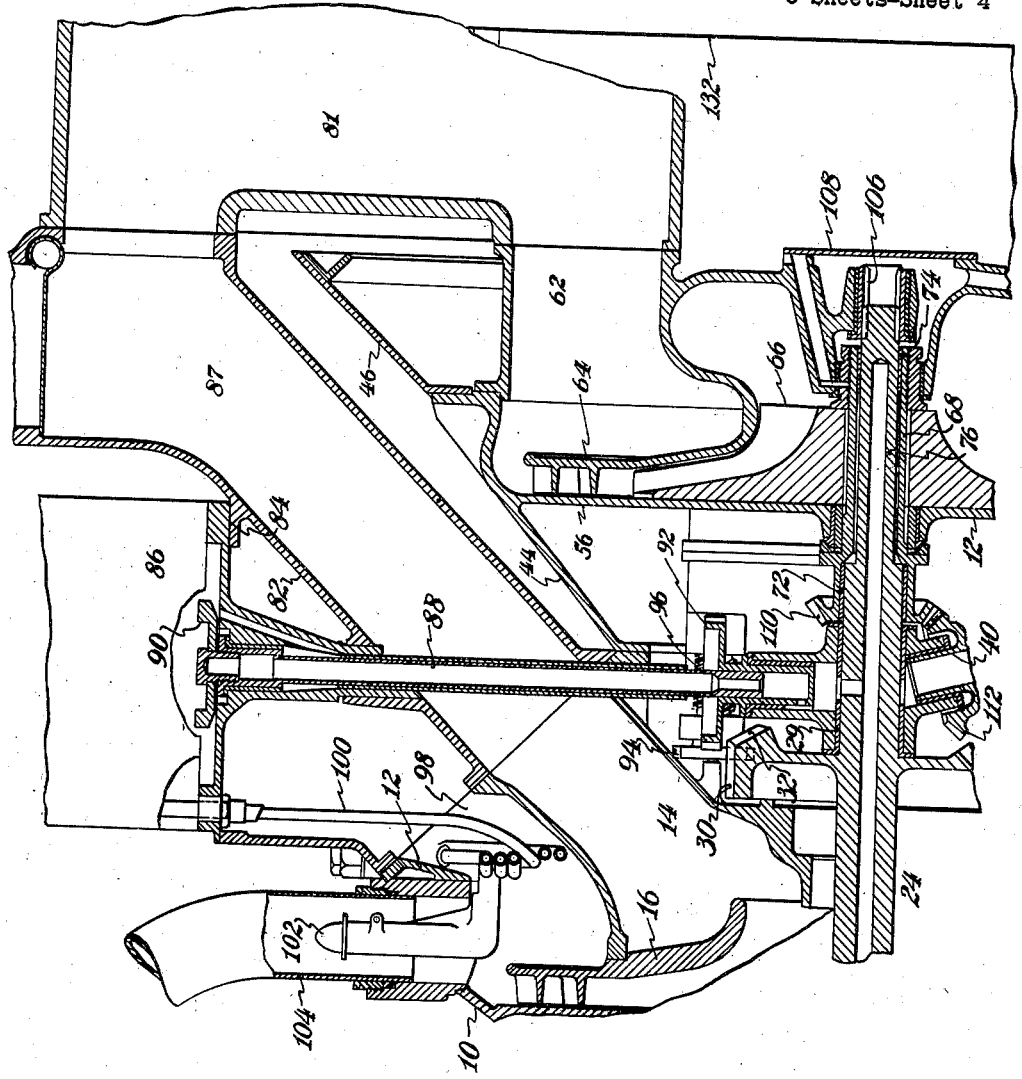
Fig. 4 is a fragmentary axial section showing a fuel charger installation.

Fig. 4 also shows an additional spare or remote drive comprising a splined sleeve 106 on the extension 74 of the tailshaft 24, a cover plate 108 being shown as covering the spare drive opening when not in use.

Figure 5:
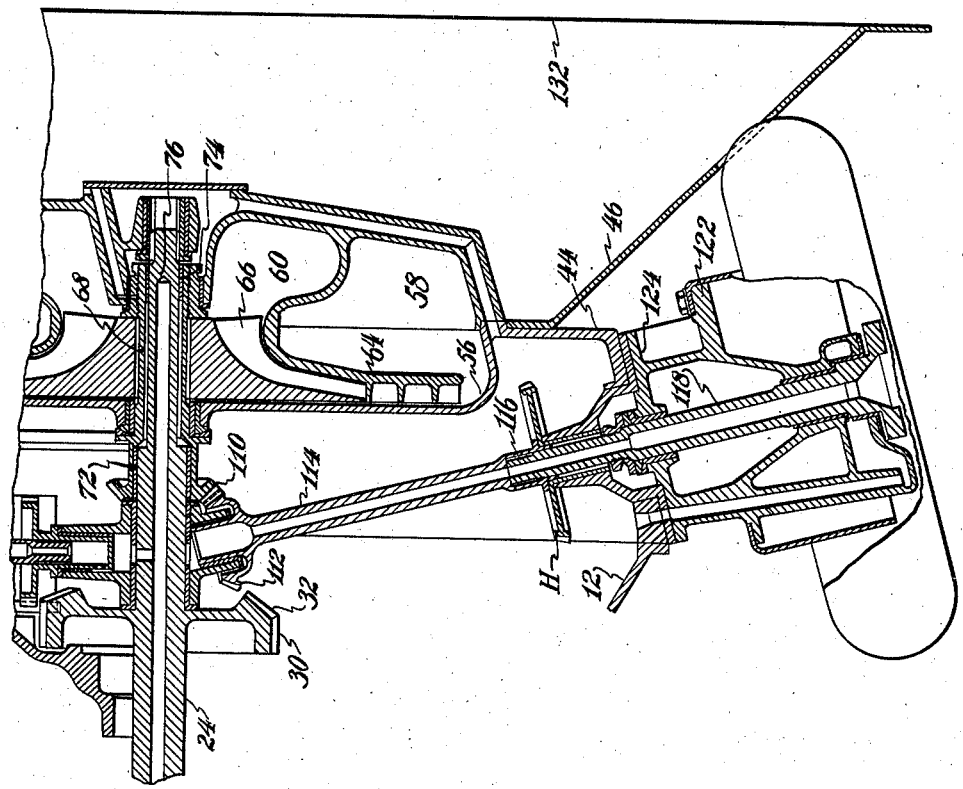
Fig. 5 is a fragmentary axial section showing a turbo supercharger drive installation.

In Fig. 5 one of the accessory stations is shown as equipped with an exhaust turbine, shown as an alternate means of driving the first stage supercharger impeller 66, the shaft 68 of which is, in this case, modified to incorporate a bevel pinion 110 meshing with a bevel gear 112 of a shaft 114 which is splined at 116 to a shaft 118 of the exhaust turbine and freely passing through one of the accessory drive bevel gears (such as H). The turbine housing, indicated in general at 122, is mounted on the associated accessory face by a flange 124.

Referring again to Fig. 3, there is indicated at 126 the exterior of a variable speed gear which may be used to drive the first stage supercharger impeller 66 as an alternate to turbo or to fixed ratio or two speed supercharger drives. Suitable drives of this character have been disclosed in my co-pending applications, Serial Numbers 680,495; 739,765 and 25,066, and, as the particular form of drive is not a part of this invention, further description is unnecessary.

Figure 2:
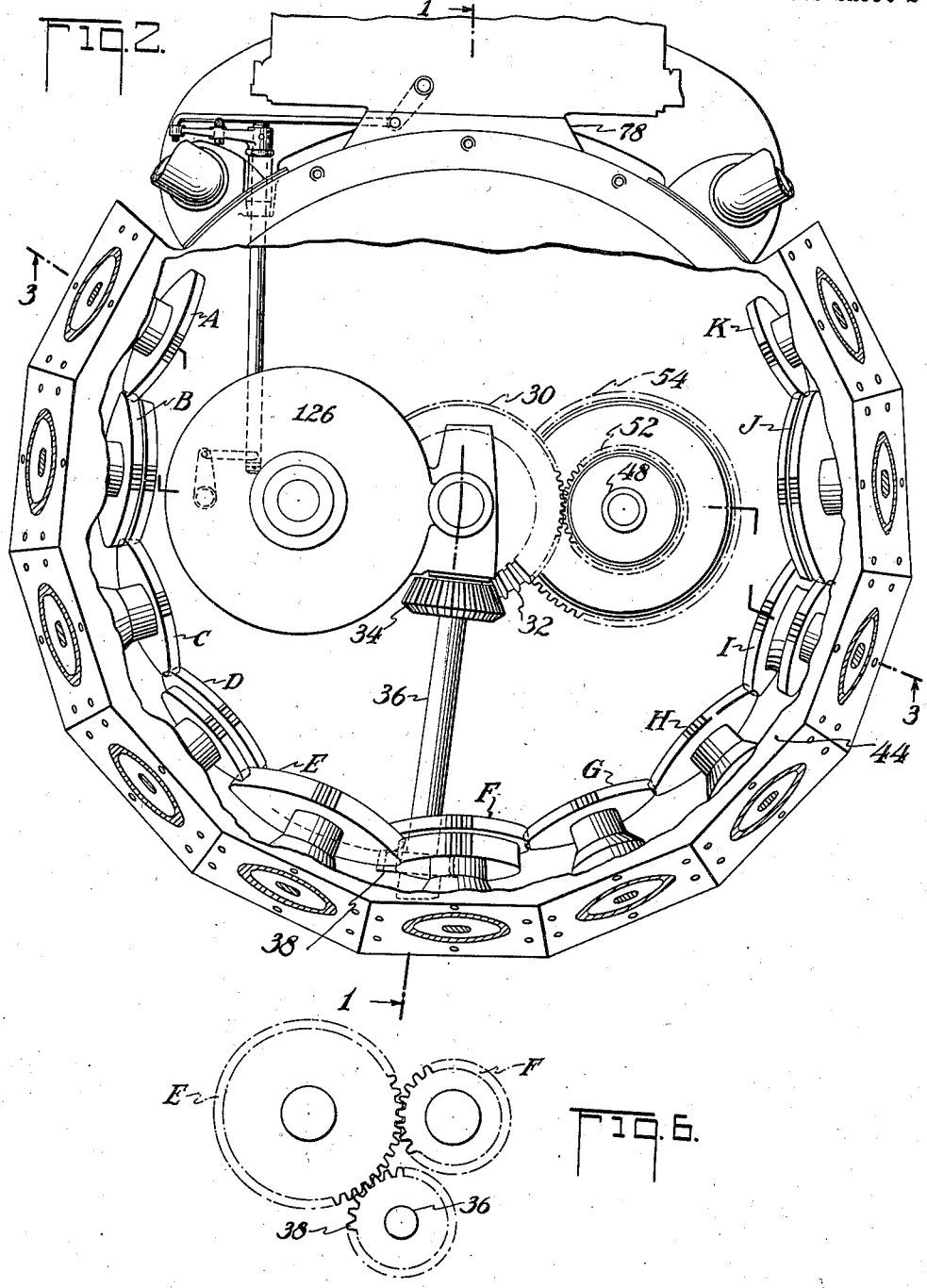
Fig. 2 is a fragmentary rear view showing the accessory drive gear train with the accessories removed, as by section at the mounting faces.
Figure 3:
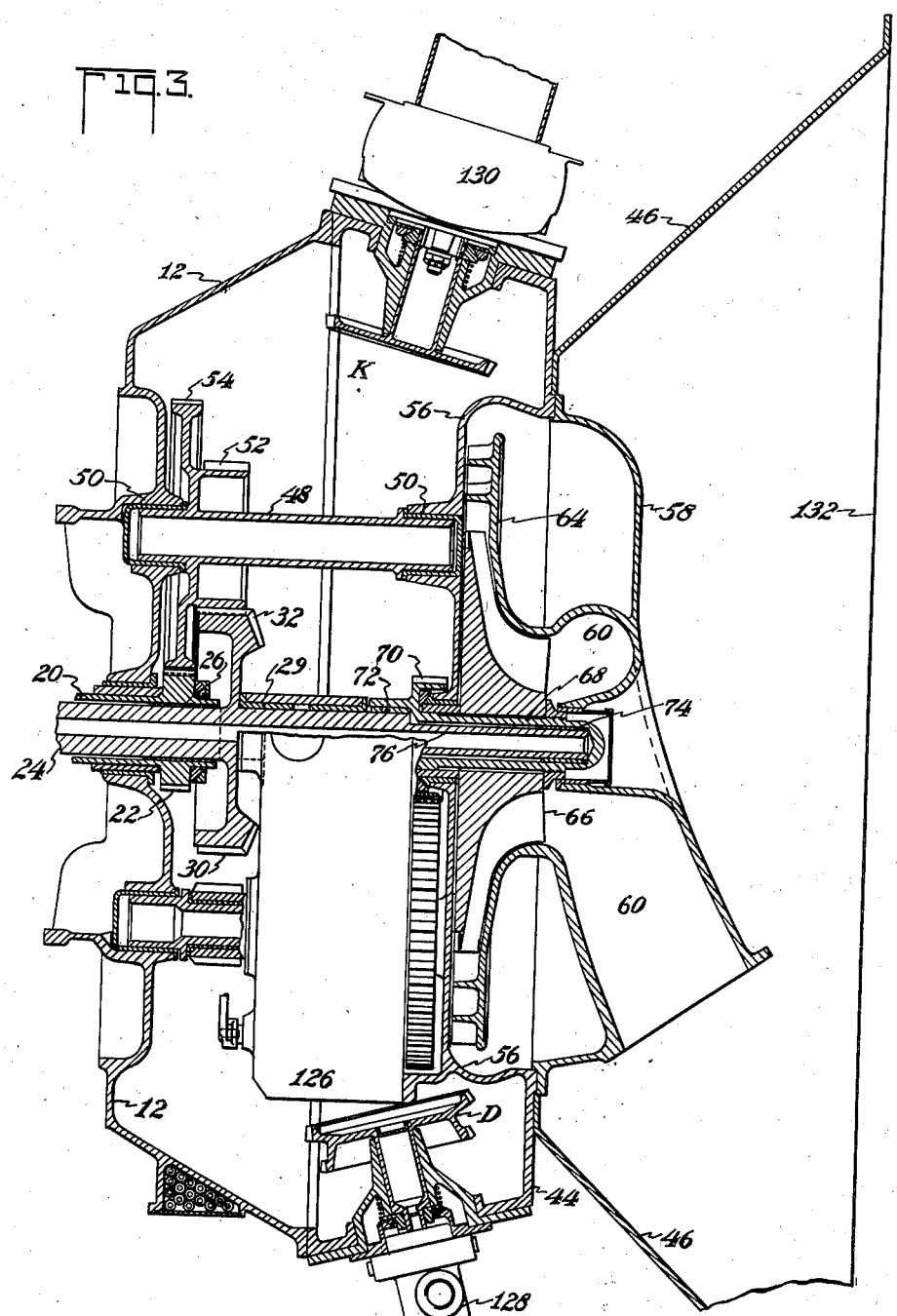
Fig. 3 is a sectional plan view, on line 3—3 of Fig. 2.

For clearness of showing, the accessories themselves have been omitted from the end view Fig. 2, although typical standard accessories such as a fuel pump 128 and a magneto 130 have been indicated in Fig. 3 and it will be understood that any required accessories may be mounted on any one of the stations A to K, inclusive, by the installation of gears of the appropriate ratio; the construction of the accessories themselves not being a part of the present invention which is intended for the use of standardized units.

It will be seen that, by the radial disposition of the accessory units, the large space available between the mounting ring and the engine cowling has been utilized in place of the conventional arrangement wherein it is attempted to crowd most of the accessories together at the rear of the engine within the ring, and that considerable length is thus saved while at the same time the accessibility of the various units is greatly increased, since these are not obstructed by the usual close proximity of the firewall or front airplane bulkhead indicated by the line 132 (Fig. 3). At the same time the arrangement of this invention permits the incorporation of a first stage supercharger within the surrounding accessories and their drives, while the actual over-all length of the engine is reduced.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. An accessory unit for an engine comprising a circumferential plurality of radial shafts, each having a gear meshed with the gear of its neighbor and defining a clear space within said gears and shafts, and a supercharger disposed within said space.

2. An accessory unit for an engine comprising a circumferential plurality of gears, each meshed with its neighbor and defining a clear space within said gears, and supercharging means disposed within said space.

3. An accessory drive unit comprising a plurality of radially disposed gears, each meshed with its neighbor to comprise an arcuate gear train, a supercharger disposed within said arc and a supercharger inlet passage disposed between the ends of said arc.

4. In an engine, the combination with a supercharger of a plurality of accessory drive gears circumferentially disposed therearound, each gear meshed with its neighbor, and means to drive one or another gear of said train for reversal of rotation thereof.

5. In an engine accessory section having circumferentially disposed mounting faces formed on the greater part of the section circumference, a plurality of serially meshed gears circumferentially arranged within the section, respective gears providing drive connections at said faces, and means to drive one of the gears of said train, said gears being of various sizes to afford a plurality of drive speeds at said faces.

6. In an engine accessory section having circumferentially disposed mounting faces formed on the greater part of the section circumference, a plurality of serially meshed gears circumferentially arranged within the section, respective gears providing drive connections at said faces, and means to drive one of the gears of said train, certain of said gears being compounded to afford a plurality of accessory drive speeds at the several faces.

7. An accessory unit for an engine comprising a hollow casing, a plurality of serially meshed gears disposed circumferentially about the inner face of the casing surface, affording a free space in the casing embraced by the gears, said gears being borne by said casing, a central drive shaft in said casing, means drivably connecting one of said gears with said shaft, and a duct for the engine induction system disposed in said free space, said duct including an engine supercharger.

ROLAND CHILTON.